C. M. SE COR.
DIRIGIBLE HEADLIGHT.
APPLICATION FILED SEPT. 11, 1918.
1,314,906.
Patented Sept. 2, 1919.
Fig. 1
Fig. 2
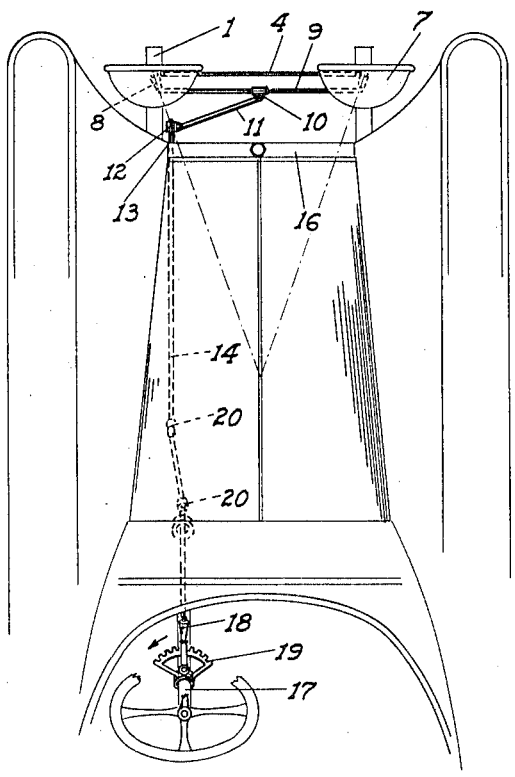
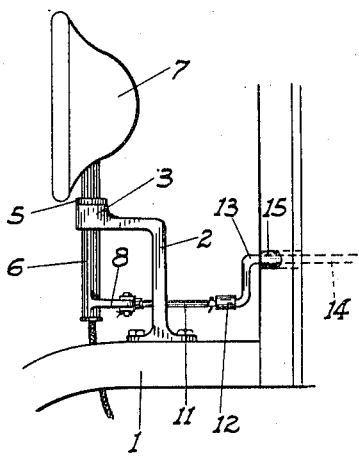
Fig. 3
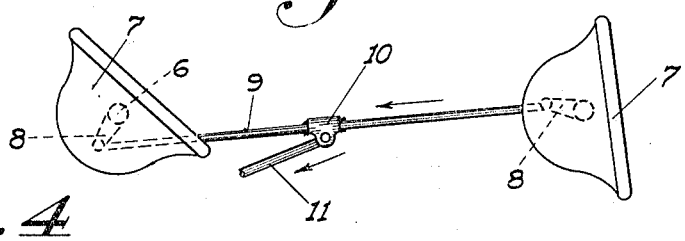
Fig. 4
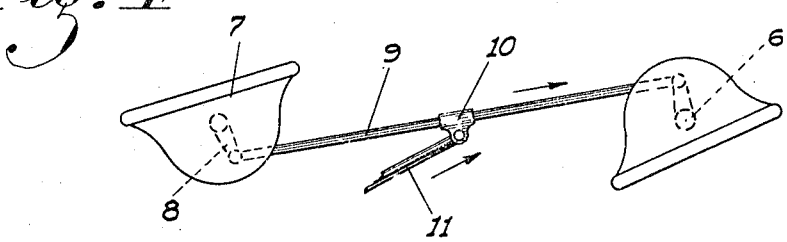
INVENTOR.
Clyde M. Se Cor
BY
ATTORNEY

UNITED STATES PATENT OFFICE.

CLYDE M. SE COR, OF LODI, CALIFORNIA.

DIRIGIBLE HEADLIGHT.

1,314,906.     Specification of Letters Patent.     Patented Sept. 2, 1919.

Application filed September 11, 1918. Serial No. 253,509.

*To all whom it may concern:*

Be it known that I, CLYDE M. SE COR, a citizen of the United States of America, residing at Lodi, in the county of San Joaquin, State of California, have invented certain new and useful Improvements in Dirigible Headlights; and I do declare the following to be a clear, full, and exact description of the same, reference being had to the accompanying drawings, and to the characters of reference marked thereon, which form a part of this application.

This invention relates to improvements in dirigible headlights for automobiles, the principal object of the invention being to so mount and connect the headlights that they may both be turned from side to side synchronously, or either one may be turned to direct its light toward the rear of the car while the other one is still facing forward. This is advantageous at night when the car is parked with a number of others, or it is desired to back and turn the car on a dark road or street, as the driver may throw the light from either lamp to the rear, while maintaining the other one facing forward, thus illuminating the ground to the rear of the car as well as forward, and enabling the driver to determine how much room he has in which to back without meeting an obstruction.

A further object is to provide a means for doing the above which will be always controllable by the driver of the car.

A third object has been to produce a simple and inexpensive device and yet one which is extremely efficient for the purposes for which it is designed.

These objects, I accomplish by means of such structure and relative arrangement of the parts as will fully appear by a perusal of the following specification and claim.

On the drawings, similar characters of reference indicate corresponding parts in the several views:

Figure 1 is a top plan view showing the device as installed on an automobile.

Fig. 2 is a fragmentary side elevation showing the mounting of one of the lights.

Fig. 3 is a diagrammatic plan showing the position of the lights just prior to the reversing of one of them.

Fig. 4 is a similar view showing the light reversed.

Referring now more particularly to the characters of reference on the drawings, the numeral 1 designates the frames of the chassis on which are mounted standards or pedestals 2 provided with bosses 3 at the upper ends thereof, and which are connected to each other by a brace rod 4. Turnable in the bosses 3, and ball mounted therein, as at 5, to provide a minimum of friction are posts 6 of the lamps 7, these posts being provided with arms 8 normally projecting rearwardly therefrom and at the lower end thereof. These arms when in such normal position slant inwardly toward each other, so that if their center lines were produced, a V would be formed, as indicated by the dot and dash lines on Fig. 1.

Secured swivelly to and between the outer ends of the arms 8 is a rod 9 centrally on which is a clevis 10 in which is pivoted one end of an arm 11, the other end thereof being pivoted to a similar clevis 12 swivelly mounted on the outer end of a crank arm 13, the actuating rod 14 of which crank arm is preferably turnably mounted in a sleeve 15 set in the shell of the radiator 16, said rod thence extending inside the hood of the engine to the steering post 17 and being mounted thereto and provided with an operating handle 18. This handle has any suitable form of spring catch thereon, which is adapted to engage with the notched quadrant 19 secured to the steering post. Universal joints 20 are interposed in the rod 14 as are necessary to give the same flexibility of turning movement.

The operation is as follows: Supposing it is desired to reverse the position of the right hand lamp, the handle 18 is turned sharply to the left (as indicated by the arrow on Fig. 1), which in turn pulls on the rods 11 and 9. The termination of this movement will place the lights in the position shown in Fig. 3 in which it will be noted that the arm 8 of the right hand lamp has gone past the inward dead center, while the arm on the left hand light is still a considerable distance from the dead center. The reason for this is on account of the normal slanting-in position of the arms 8, which position places the arms nearer the inward dead center than the outer before any movement of the rods and arms takes place. The left hand arm 8 of course moves through the same arc as the right hand arm, but it is moving away from its inward dead center toward its outer dead center, from which point it is of course farther away than the right hand arm from its inward dead center. The same reasoning applies in the case of the reversal of the left hand lamp.

Of course any slow pull on the rod 9 would place the right hand arm 8 at dead center and no farther, but owing to the momentum given the lamp by the sharp pull and the fact that it is ball mounted, the point of dead center is passed.

In this position, the pressure on the handle is reversed, and the same is then pulled over to the right. This pushes on the rods 11 and 9, and the right hand lamp is thus turned backward to the required degree as shown in Fig. 4. To return the lamps to normal position, movements the reverse of the ones described are carried out.

For ordinary illumination of the road ahead on either side of the car, the lamps may of course be swung without reversing either lamp.

From the foregoing description it will readily be seen that I have produced such a device as substantially fulfils the objects of the invention as set forth herein.

While this specification sets forth in detail the present and preferred construction of the device, still in practice, such deviations from such detail may be resorted to as do not form a departure from the spirit of the invention, as defined by the appended claim.

Having thus described my invention, what I claim as new and useful and desire to secure by Letters Patent is:—

A dirigible headlight for vehicles comprising pedestals mounted on the frame of the vehicle, posts turnably mounted on bearings in the pedestals, relatively heavy lamps on the posts, arms projecting from the posts at right angles thereto and extending normally to the rear thereof, a rod connecting the outer ends of the arms and swivelly secured thereto and being shorter than the distance between the posts whereby the arms will normally converge toward each other, and an actuating rod swivelly secured to the connecting rod centrally thereof and at an acute angle thereto and adapted to exert pressure on the connecting rod to move the same in a lateral direction, whereby a sharp pull on the rod will cause the heavy lamp to turn the pulled arm past its inner dead center, and a push on the rod will then reverse the lamp to throw its light to the rear of the vehicle.

In testimony whereof I affix my signature in presence of two witnesses.

CLYDE M. SE COR.

Witnesses:
BERNARD PRIVAT,
FRANK H. CARTER.